(12) United States Patent
Chen et al.

(10) Patent No.: US 9,444,664 B2
(45) Date of Patent: Sep. 13, 2016

(54) CHANNEL FREQUENCY OFFSET ESTIMATION METHOD, APPARATUS, AND SYSTEM

(71) Applicant: Huawei Technologies Co., Ltd., Shenzhen, Guangdong (CN)

(72) Inventors: Zihuan Chen, Chengdu (CN); Dafeng Tian, Chengdu (CN); Xiaodong Li, Chengdu (CN); Qiao Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 14/035,873

(22) Filed: Sep. 24, 2013

(65) Prior Publication Data

US 2014/0023094 A1   Jan. 23, 2014

Related U.S. Application Data

(63) Continuation of application No. PCT/CN2012/071056, filed on Feb. 13, 2012.

(51) Int. Cl.
*H04L 27/00* (2006.01)
*H04L 25/02* (2006.01)

(52) U.S. Cl.
CPC ....... *H04L 27/0014* (2013.01); *H04L 25/0202* (2013.01); *H04L 2027/004* (2013.01); *H04L 2027/0067* (2013.01)

(58) Field of Classification Search
None
See application file for complete search history.

(56) References Cited

U.S. PATENT DOCUMENTS

| 6,522,696 B1 | 2/2003 | Mobin et al. |
| 2003/0026361 A1* | 2/2003 | Talwalkar ........... H04L 27/0014 375/344 |

(Continued)

FOREIGN PATENT DOCUMENTS

| CN | 101079857 A | 11/2007 |
| CN | 102075460 A | 5/2011 |

(Continued)

OTHER PUBLICATIONS

International Search Report in corresponding PCT Patent Application No. PCT/CN2012/071056 (Nov. 22, 2012).

*Primary Examiner* — Hassan Phillips
*Assistant Examiner* — Gautam Sharma
(74) *Attorney, Agent, or Firm* — Leydig, Voit & Mayer, Ltd.

(57) ABSTRACT

Embodiments of the present invention provide a method, includes: performing channel estimation on a signal of a current channel to obtain channel information of the current channel, performing calculation processing on the channel information obtained in current channel estimation and channel information obtained in previous channel estimation to obtain a phase difference of the current channel information, dividing the phase difference of the current channel information by a time interval between two times of channel estimation to obtain residual frequency offset information of the current channel, adding the residual frequency offset information of the current channel and frequency offset information which is of the channel and obtained in a previous calculation to obtain frequency offset information of the current channel, and outputting the frequency offset information of the current channel, so as to perform frequency offset correction on the signal of the channel according to the current frequency offset information.

20 Claims, 4 Drawing Sheets

(56) References Cited

U.S. PATENT DOCUMENTS

| | | | |
|---|---|---|---|
| 2005/0122895 A1* | 6/2005 | Zhou | H04L 27/2657 370/210 |
| 2007/0098091 A1* | 5/2007 | Hou | H04L 27/2657 375/260 |
| 2008/0013650 A1* | 1/2008 | Engdahl | H04B 1/7087 375/344 |
| 2008/0101496 A1* | 5/2008 | Gaikwad | H04L 1/0631 375/267 |
| 2010/0272196 A1* | 10/2010 | Mansour | H04L 25/0228 375/260 |
| 2011/0116562 A1* | 5/2011 | Li | H04L 27/0014 375/260 |

FOREIGN PATENT DOCUMENTS

| | | |
|---|---|---|
| CN | 102082744 A | 6/2011 |
| CN | 102130880 A | 7/2011 |

* cited by examiner

CHANNEL FREQUENCY OFFSET ESTIMATION METHOD, APPARATUS, AND SYSTEM

CROSS-REFERENCE TO RELATED APPLICATIONS

This application is a continuation of International Patent Application No. PCT/CN2012/071056, filed on Feb. 13, 2012, which is hereby incorporated by reference in its entirety.

FIELD OF THE INVENTION

The present invention relates to the field of communication, and in particular, to a channel frequency offset estimation method, apparatus, and system.

BACKGROUND OF THE INVENTION

An information transmission manner has evolved from optical fiber transmission to microwave transmission. However, because spectrum resources of a commonly-used frequency band in a microwave transmission manner are limited, multi-input multi-output (MIMO for short) has become a future development trend of microwave technologies.

Distributed MIMO is main architecture in microwave MIMO, and is highly compatible and easy to be installed. Due to independence of an ODU (Out Door Unit, digital microwave transceiver), sources of carriers at a sending end and carriers at a receiving end are different, which brings a serious synchronization problem to a system.

In an existing wireless communication system, because a carrier frequency is low, a carrier frequency offset is not serious and does not have a great effect on the system. Therefore, a method of performing channel estimation or frequency offset estimation separately is usually adopted. However, in a microwave communication system with a high carrier frequency, the method in wireless communication is not applicable. At present, no method is put forward to satisfactorily solve a carrier frequency offset of a channel in the microwave communication system.

SUMMARY OF THE INVENTION

Embodiments of the present invention provide a channel frequency offset estimation method, apparatus, and system, which are capable of processing a carrier frequency offset in a high-frequency microwave communication system.

In order to achieve the foregoing objective, the embodiments of the present invention adopt the following technical solutions.

In one aspect, a channel frequency offset estimation method is provided, including:

performing channel estimation on a signal of a current channel to obtain channel information of the current channel;

performing calculation processing on the channel information obtained in current channel estimation and channel information obtained in previous channel estimation to obtain a phase difference of the current channel information, and dividing the phase difference of the current channel information by a time interval between two times of channel estimation to obtain residual frequency offset information of the current channel;

adding the residual frequency offset information of the current channel and frequency offset information which is of the channel and obtained in a previous calculation to obtain frequency offset information of the current channel; and outputting the frequency offset information of the current channel, so as to perform frequency offset correction on the signal of the channel according to the current frequency offset information.

In one aspect, a channel frequency offset estimation apparatus is provided, including:

a channel estimation unit, configured to perform channel estimation on a signal of a current channel to obtain channel information of the current channel; and a frequency offset estimation unit, configured to perform calculation processing on the channel information obtained in current channel estimation and channel information obtained in previous channel estimation to obtain a phase difference of the current channel information, divide the phase difference of the current channel information by a time interval between two times of channel estimation to obtain residual frequency offset information of the current channel, add the residual frequency offset information of the current channel and frequency offset information which is of the channel and obtained in a previous calculation to obtain frequency offset information of the current channel, and output the frequency offset information of the current channel, so as to perform frequency offset correction on the signal of the channel according to the current frequency offset information.

In one aspect, a channel frequency offset estimation system is provided, including:

the channel frequency offset estimation apparatus according to any one of claims 15 to 19;

a frequency offset correction unit connected to the channel frequency offset estimation apparatus; and a channel equalization unit connected to the channel frequency offset estimation apparatus and the frequency offset correction unit.

In the frequency offset estimation method, apparatus, and system provided in the embodiments of the present invention, frequency offset estimation is performed in a manner of combining channel estimation and frequency offset estimation, which can process the carrier frequency offset in the high-frequency microwave communication system. In this manner, there is no need to perform the frequency offset estimation separately, thereby reducing calculation complexity and improving realizability. Furthermore, a residual frequency offset is monitored and eliminated, thereby improving accuracy of the channel estimation and stability of the system.

BRIEF DESCRIPTION OF THE DRAWINGS

To illustrate the technical solutions in the embodiments of the present invention or in the prior art more clearly, accompanying drawings required for describing the embodiments or the prior art are briefly introduced below. Apparently, the accompanying drawings in the following description are merely some embodiments of the present invention, and persons of ordinary skill in the art may further obtain other drawings according to the accompanying drawings without creative efforts.

DETAILED DESCRIPTION OF THE EMBODIMENTS

The technical solutions in the embodiments of the present invention are described clearly and completely below with reference to the accompanying drawings in the embodiments of the present invention. Evidently, the embodiments to be described are only part of rather than all of the embodiments of the present invention. All other embodiments obtained by persons of ordinary skill in the art based on the embodiments of the present invention without creative efforts shall fall within the protection scope of the present invention.

Figure 1:
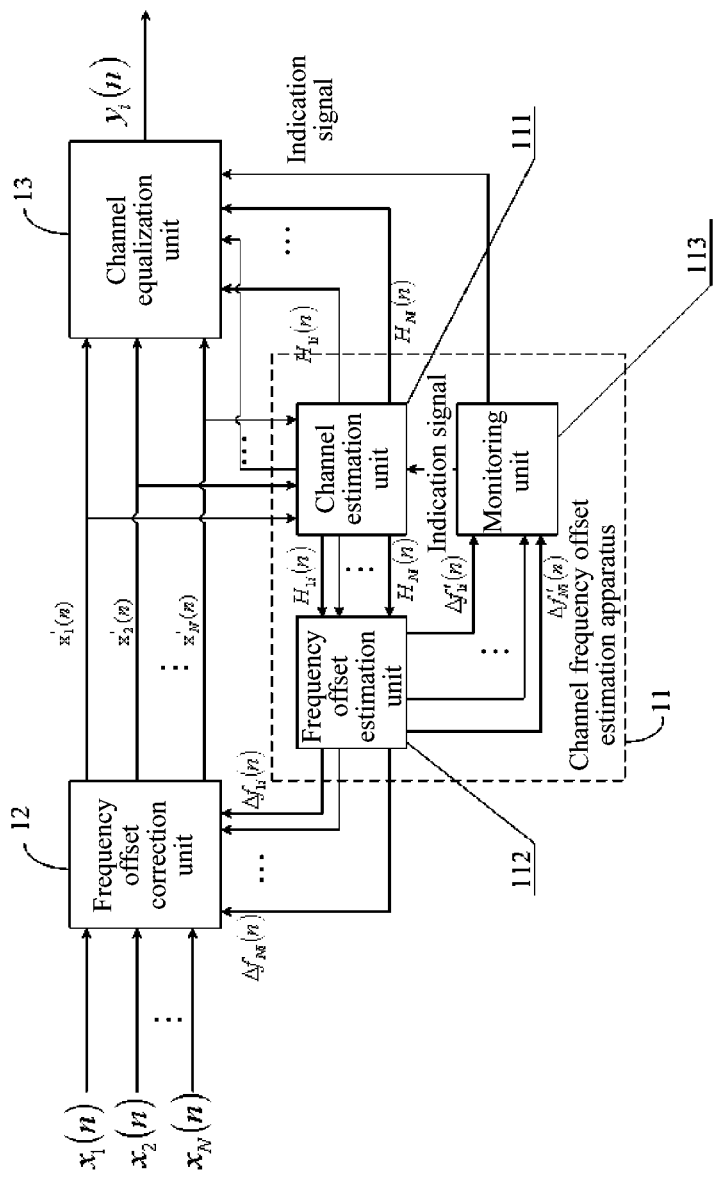
FIG. 1 is a first schematic structural diagram of a frequency offset estimation system according to an embodiment of the present invention.

A channel frequency offset estimation method provided in an embodiment of the present invention is described by taking a system shown in FIG. 1 as an example.

The system includes a frequency offset correction unit 12, a channel equalization unit 13, and a channel frequency offset estimation apparatus 11 that are interconnected, where the channel frequency offset estimation apparatus 11 further includes a channel estimation unit 111, a frequency offset estimation unit 112, and a monitoring unit 113.

Specifically, in the system shown in FIG. 1, a signal $x_i(n)$ (i =1, 2, . . . N) in a channel is input to the frequency offset correction unit 12. After simple signal correction is performed by using the prior art, a signal $x'_i(n)$ is obtained. The signal $x'_i(n)$ is input to the channel frequency offset estimation apparatus 11.

The channel estimation unit 111 in the channel frequency offset estimation apparatus 11 performs channel estimation on the signal $x'_i(n)$ of the current channel to obtain channel information $H_{ij}(n)$ of the current channel by using methods based on training, blind estimation, and so on, where the $H_{ij}(n)$ indicates a channel from a $j^{th}$ sending end to an $i^{th}$ receiving end; the channel estimation unit 111 sends the obtained channel information $H_{ij}(n)$ of the current channel to the frequency offset estimation unit 112.

According to a formula $$\Delta f'_{ij} = \frac{\angle(H_{ij}(n)) + \angle(H^*_{ij}(n-L))}{L},$$

$$\Delta f'_{ij} = \frac{\angle(H_{ij}(n)) - \angle H_{ij}(n-L))}{L},$$

or $$\Delta f'_{ij} = \frac{\angle(H_{ij}(n) \cdot H^*_{ij}(n-L))}{L},$$

the frequency offset estimation unit 112 performs a calculation on the channel information $H_{ij}(n)$ of the current channel and channel information $H_{ij}(n-L)$ obtained in previous channel estimation to obtain a phase difference of the channel information, and divides the phase difference of the channel information by a time interval between two times of channel estimation to obtain residual frequency offset information $\Delta f'_{ij}(n)$ of the current channel, where L indicates a time interval between two times of channel estimation, [●]* indicates a symbol for calculating conjugation, ∠ is a symbol for calculating a phase angle, and $\angle(H_{ij}(n) \cdot H^*_{ij}(n-L))$ also indicates a calculated phase difference of the channel information. It should be noted that the foregoing three formulas for calculating the residual frequency offset information $\Delta f'_{ij}(n)$ of the current channel are substantially the same though expression forms are different. Therefore, all the formulas may be used to calculate the residual frequency offset information $\Delta f'_{ij}(n)$ of the current channel.

Then, according to a formula $\Delta f_{ij}(n)=\Delta f_{ij}(n-L)+\Delta f'_{ij}(n)$, the frequency offset estimation unit 112 performs a calculation on the residual frequency offset information $\Delta f'_{ij}(n)$ of the current channel and frequency offset information $\Delta f_{ij}(n-L)$ which is of the channel and obtained in a previous calculation to obtain frequency offset information $\Delta f_{ij}(n)$ of the current channel, updates the frequency offset information $\Delta f_{ij}(n-L)$ obtained in the previous calculation by using the frequency offset information $\Delta f_{ij}(n)$ of the current channel, and saves the frequency offset information $\Delta f_{ij}(n)$ of the channel Then, the frequency offset estimation unit 112 outputs the frequency offset information $\Delta f_{ij}(n)$ of the current channel to the frequency offset correction unit 12, so that the frequency offset correction unit 12 performs frequency offset correction on the signal of the current channel according to the frequency offset information $\Delta f_{ij}(n)$. It should be noted that, in the embodiment of the present invention, after the frequency offset information $\Delta f_{ij}(n)$ of the current channel is obtained, the frequency offset information $\Delta f_{ij}(n)$ of the current channel may be used to update the frequency offset information $\Delta f_{ij}(n-L)$ obtained in the previous calculation, and the frequency offset information $\Delta f_{ij}(n)$ of the channel is saved. In this manner, it may be ensured that previous frequency offset information $\Delta f_{ij}(n)$ of the channel is used in a subsequent frequency offset calculation process. However, the steps of updating and saving may not be performed, which is not limited by the present invention.

Furthermore, the frequency offset estimation unit 112 may further send the residual frequency offset information $\Delta f'_{ij}(n)$ of the current channel to the monitoring unit 113.

The monitoring unit 113 compares the residual frequency offset information $\Delta f'_{ij}(n)$ which is of the channel and obtained in a current calculation with a first preset threshold value, and if it is determined that all residual frequency offset information $\Delta f'_{ij}(n)$ which is of the channel and obtained in the current calculation is smaller than the first preset threshold value, sends an indication signal to the channel estimation unit 111 and the channel equalization unit 13 to notify the channel estimation unit 111 that the channel information estimated at this time is reliable and may be sent to the channel equalization unit 13, to make the channel equalization unit 13 start working. If an equalizer of the channel equalization unit 13 has a coefficient updating module, the equalizer of the channel equalization unit 13 may enable the module. On the contrary, if it is determined that at least one piece of the residual frequency offset information $\Delta f'_{ij}(n)$ which is of the channel and obtained in the current calculation is greater than or equal to the first preset threshold value, the monitoring unit 113 sends an indication signal to the channel estimation unit 111 and the channel equalization unit 13 to notify the channel estimation unit 111 that the channel information estimated at this time is significantly affected by a frequency offset and cannot be sent to the channel equalization unit 13, and the channel equalization unit 13 stops working.

It should be noted that, in this embodiment, the channel equalization unit 13 is a functional module after the frequency offset correction is performed, but the embodiment of the present invention is not limited to this, and the functional module after the frequency offset correction may be another functional unit or module. In addition, the first preset threshold value may be set manually, and the channel equalization unit 13 may be an equalizer, and may also be others, which is not limited by the present invention.

In the frequency offset estimation method and system provided in the embodiment of the present invention, frequency offset estimation is performed in a manner of combining channel estimation and frequency offset estimation, which can process a carrier frequency offset in a high-frequency microwave communication system. In this manner, there is no need to perform the frequency offset estimation separately, thereby reducing calculation complexity and improving realizability. Furthermore, a residual frequency offset is monitored and eliminated, thereby improving accuracy of the channel estimation and stability of the system. In addition, by using the monitoring unit, effective detection and utilization of a signal frequency offset estimation result is implemented.

Figure 2:
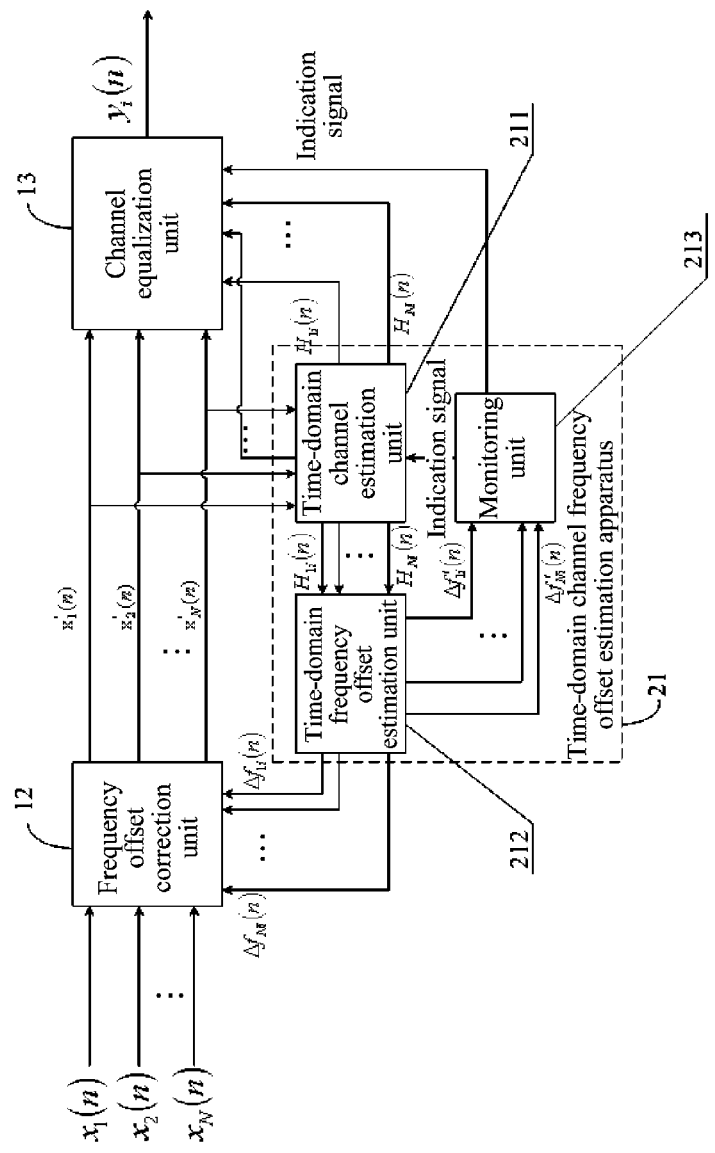
FIG. 2 is a second schematic structural diagram of a frequency offset estimation system according to an embodiment of the present invention.

Another embodiment of the present invention provides a channel frequency offset estimation method implemented in a time domain, which is described by taking a system shown in FIG. 2 as an example.

The system includes a frequency offset correction unit 12, a channel equalization unit 13, and a time-domain channel frequency offset estimation apparatus 21 that are interconnected, where the time-domain channel frequency offset estimation apparatus 21 further includes a time-domain channel estimation unit 211, a time-domain frequency offset estimation unit 212, and a monitoring unit 213.

Specifically, in the system shown in FIG. 2, in a time-domain frequency offset estimation system, a signal $x_{TDi}(n)$ in a time-domain channel at a current moment is input to the frequency offset correction unit 12. After simple signal correction is performed by using the prior art, a time-domain signal $x'_{TDi}(n)$ at the current moment is obtained, and the time-domain signal $x'_{TDi}(n)$ at the current moment is input to the time-domain channel frequency offset estimation apparatus 21.

The time-domain channel estimation unit 211 in the time-domain channel frequency offset estimation apparatus 21 performs time-domain channel estimation on the signal of the time-domain channel at the current moment to obtain channel information of the time-domain channel at the current moment, and extracts information $H_{TDij}(n)$ with a greatest amplitude in the time-domain channel information at the current moment, where the $H_{ij}(n)$ indicates a channel from a $j^{th}$ sending end to an $i^{th}$ receiving end; the time-domain channel estimation unit 211 sends the obtained channel information $H_{TDij}(n)$ which is of the time-domain channel and with the greatest amplitude in the time-domain channel information at the current moment to the time-domain frequency offset estimation unit 212. In addition, after the channel information of the time-domain channel at the current moment is obtained through the estimation, information $H_{TDij}(n)$ with an average amplitude in the time-domain channel information at the current moment may also be extracted; and after the channel information of the time-domain channel at the current moment is obtained through the estimation, channel information $H_{TDij}(n)$ with any amplitude in the time-domain channel information at the current moment may also be extracted, which is not limited by the present invention.

According to a formula $$\Delta f'_{TDij} = \frac{\angle(H_{TDij}(n)) + \angle(H^*_{TDij}(n-L))}{L},$$

$$\Delta f'_{TDij} = \frac{\angle(H_{TDij}(n)) - \angle H_{TDij}(n-L))}{L}$$

or $$\Delta f'_{TDij} = \frac{\angle(H_{TDij}(n) \cdot H^*_{TDij}(n-L))}{L},$$

the time-domain frequency offset estimation unit 212 performs a calculation on the channel information $H_{TDij}(n)$ of the time-domain channel at the current moment and time-domain channel information $H_{TDij}(n-L)$ obtained through time-domain channel estimation at a previous moment, to obtain a phase difference of the time-domain channel information at the current moment, and divides the phase difference by a time interval between two times of channel estimation to obtain residual frequency offset information $\Delta f'_{TDij}(n)$ of the time-domain channel at the current moment, where L indicates a time interval between two times of time-domain channel estimation, [●]* indicates a symbol for calculating conjugation, ∠ is a symbol for calculating a phase angle, and $\angle(H_{TDij}(n)\cdot H^*_{TDij}(n-L))$ also indicates a calculated phase difference of the time-domain channel information. It should be noted that the foregoing three formulas for calculating residual frequency offset information $\Delta f'_{TDij}(n)$ of the time-domain channel are substantially the same though expression forms are different. Therefore, all the formulas may be used to calculate the residual frequency offset information $\Delta f'_{TDij}(n)$ of the time-domain channel Then, according to a formula $\Delta f_{TDij}(n)=\Delta f_{TDij}(n-L)+\Delta f'_{TDij}(n)$, the time-domain frequency offset estimation unit 212 performs a calculation on the residual frequency offset information $\Delta f'_{TDij}(n)$ of the time-domain channel at the current moment and time-domain frequency offset information $\Delta f_{TDij}(n-L)$ obtained in a calculation at the previous moment to obtain frequency offset information $\Delta f_{TDij}(n)$ of the time-domain channel at the current moment, updates frequency offset information $\Delta f_{TDij}(n-L)$ obtained in the calculation at the previous moment by using the frequency offset information $\Delta f_{TDij}(n)$ of the time-domain channel at the current moment, and saves the frequency offset information $\Delta f_{TDij}(n)$ of the time-domain channel at the current moment. Then, the time-domain frequency offset estimation unit 212 outputs the frequency offset information $\Delta f_{TDij}(n)$ of the time-domain channel at the current moment to the frequency offset correction unit 12, so that the frequency offset correction unit 12 performs frequency offset correction on the signal of the time-domain channel at the current moment according to the time-domain frequency offset information $\Delta f_{TDij}(n)$. It should be noted that, in the embodiment of the present invention, after the frequency offset information $\Delta f_{TDij}(n)$ of the time-domain channel at the current moment is obtained, the frequency offset information $\Delta f_{TDij}(n)$ of the time-domain channel at the current moment may be used to update the frequency offset information $\Delta f_{TDij}(n-L)$ obtained in the calculation at the previous moment, and the frequency offset information $\Delta f_{TDij}(n)$ of the time-domain channel at the current moment is saved. In this manner, it is ensured that the frequency offset information of the time-domain channel at the previous moment is used in a subsequent frequency offset calculation process, but the steps of updating and saving may not be performed, which is not limited by the present invention.

Furthermore, the time-domain frequency offset estimation unit 212 may further send the residual frequency offset information $\Delta f'_{TDij}(n)$ of the time-domain channel at the current moment to the monitoring unit 213.

The monitoring unit 213 compares the residual frequency offset information $\Delta f'_{TDij}(n)$ which is of the time-domain channel and obtained in a calculation at the current moment with a second preset threshold value, and if it is determined that all residual frequency offset information $\Delta f'_{TDij}(n)$ which is of the time-domain channel and obtained in the calculation is smaller than the second preset threshold value, sends an indication signal to the time-domain channel estimation unit 211 and the channel equalization unit 13 to notify the time-domain channel estimation unit 211 that the channel information estimated at this time is reliable and may be sent to the channel equalization unit 13, to make the channel equalization unit 13 start working. If an equalizer of the channel equalization unit 13 has a built-in coefficient updating module, the equalizer of the channel equalization unit 13 may enable the module. On the contrary, if it is determined that at least one piece of the residual frequency offset information $\Delta f'_{TDij}(n)$ which is of the time-domain channel and obtained in the calculation is greater than or equal to the second preset threshold value, the monitoring unit 113 sends an indication signal to the time-domain channel estimation unit 211 and the channel equalization unit 13 to notify the time-domain channel estimation unit 211 that the channel information estimated at this time is significantly affected by a frequency offset and cannot be sent to the channel equalization unit 13, and the channel equalization unit 13 stops working. For a channel, the second preset threshold value has a same function as a first threshold value. Due to its application in a time-domain channel, the preset threshold value is defined as a second threshold value. In this manner, for the time-domain channel, effectiveness of a signal may be detected more accurately.

It should be noted that, in this embodiment, the channel equalization unit 13 is a functional module after the frequency offset correction is performed, but the embodiment of the present invention is not limited to this, and the functional module after the frequency offset correction may be another functional unit or module. In addition, the second preset threshold value may be set manually, and the channel equalization unit 13 may be an equalizer, and may also be others, which is not specifically limited by the present invention.

In the frequency offset estimation method and system provided in the embodiment of the present invention, time-domain frequency offset estimation is performed in a manner of combining time-domain channel estimation and time-domain frequency offset estimation, which can process a carrier frequency offset in a high-frequency microwave communication system. In this manner, there is no need to perform frequency offset estimation separately, thereby reducing calculation complexity and improving realizability. Furthermore, a residual frequency offset is monitored and eliminated, thereby improving accuracy of the channel estimation and stability of the system. In addition, by using the monitoring unit, effective detection and utilization of a signal frequency offset estimation result is implemented.

Figure 3:
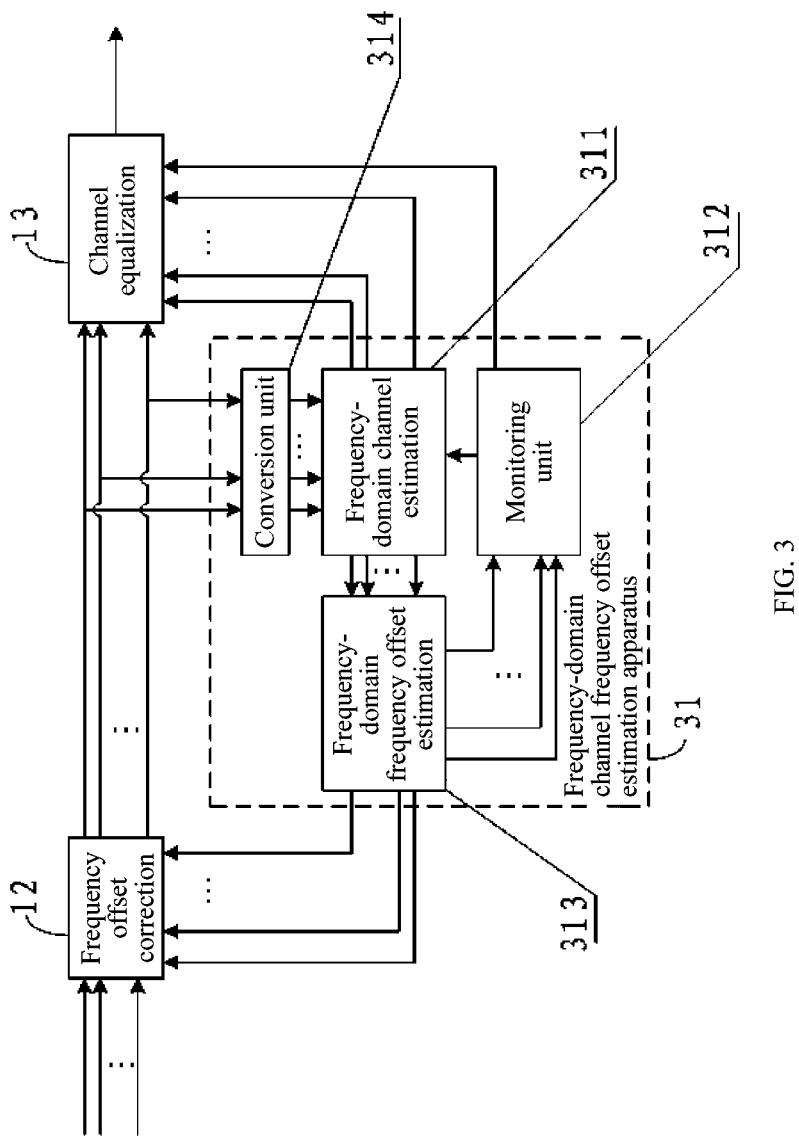
FIG. 3 is a third schematic structural diagram of a frequency offset estimation system according to an embodiment of the present invention.

Another embodiment of the present invention provides a channel frequency offset estimation system and method implemented in a frequency domain, which are described by taking a system shown in FIG. 3 as an example.

The system includes a frequency offset correction unit 12, a channel equalization unit 13, and a frequency-domain channel frequency offset estimation apparatus 31 that are interconnected, where the frequency-domain channel frequency offset estimation apparatus 31 further includes a conversion unit 314, a frequency-domain channel estimation unit 311, a frequency-domain frequency offset estimation unit 312, and a monitoring unit 313.

Specifically, in the system shown in FIG. 3, a signal $x_i(n)$ in a current channel is input to the frequency offset correction unit 12. After simple signal correction is performed by using the prior art, a current signal $x'_i(n)$ is obtained. The current signal $x'_i(n)$ is input to the frequency-domain channel frequency offset estimation apparatus 31.

The conversion unit 314 in the frequency-domain channel frequency offset estimation apparatus 31 performs a fast Fourier transform or discrete Fourier transform on the signal $x'_i(n)$ of the current channel to obtain a signal $x_i(k)$ of a current frequency-domain channel, and the signal $x_i(k)$ is input to the frequency-domain channel estimation unit 311.

The frequency-domain channel estimation unit 311 performs frequency-domain channel estimation on the signal $x_i(k)$ of the current frequency-domain channel to obtain channel information $H_{ij,k}(n)$ of the current frequency-domain channel, where k indicates a $k^{th}$ sub-channel, (k=0, ..., N1, N), and N indicates the number of frequency-domain sub-channels. The $H_{ij,k}(n)$ indicates a channel from a $j^{th}$ sending end to an $i^{th}$ receiving end in the $k^{th}$ sub-channel; the obtained channel information $H_{ij,k}(n)$ of the current frequency-domain channel is sent to the frequency-domain frequency offset estimation unit 312.

According to a formula $$\Delta f'_{FDij}(n) = \frac{\sum_{k \in SC_{FD}} (\angle H_{ij,k}(n) + \angle H^*_{ij,k}(n-L))}{L * K},$$

$$\Delta f'_{FDij}(n) = \frac{\sum_{k \in SC_{FD}} (\angle H_{ij,k}(n) - \angle H_{ij,k}(n-L))}{L \cdot K}$$

or $$\Delta f'_{FDij}(n) = \frac{\sum_{k \in SC_{FD}} \angle (H_{ij,k}(n) \cdot H^*_{ij,k}(n-L))}{L \cdot K},$$

the frequency-domain frequency offset estimation unit 312 performs a calculation on the channel information $H_{ij,k}(n)$ of the current frequency-domain channel and frequency-domain channel information $H_{ij,k}(n-L)$ obtained in previous channel estimation, to obtain residual frequency offset information $\Delta f'_{FDij}(n)$ of the current frequency-domain channel, where [●]* indicates calculating conjugation, ∠ is a symbol for calculating a phase angle, Σ indicates summation, k ∈ $SC_{FD}$ indicates that k belongs to a frequency-domain sub-channel set, K indicates the number of sub-channels used for calculating a residual frequency offset, that is, the number used in the summation, 1<=K<=N, L indicates a time interval between two times of frequency-domain channel estimation, and ∠ ($H_{FDij}(n) \cdot H^*_{FDij}(n-L)$) also indicates a calculated phase difference of the channel information. It should be noted that the foregoing formulas are substantially the same though forms are different. After a phase of the frequency-domain channel information $H_{ij,k}(n-L)$ obtained in the previous channel estimation is subtracted from a phase of the channel information $H_{ij,k}(n)$ of the current frequency-domain channel, a phase difference of the channel information is obtained through the calculation; and then summation is performed, where several sub-channels in the frequency-domain sub-channel set or all sub-channels may be selected as the number k used in summation. Then, the phase difference is divided by the number K of the selected sub-channels, and then divided by the time interval between two times of channel estimation to obtain a residual frequency offset $\Delta f_{FDij}(n)$. In addition, the phase difference between the two may also be directly obtained by subtracting one phase from the other, and then the phase difference is divided by the time interval between two times of channel estimation to obtain the residual frequency offset $\Delta f_{FDij}(n)$, which is not limited by the present invention.

Then, according to a formula $\Delta f_{FDij}(n)=\Delta f_{FDij}(n-L)+ f_{FDij}(n)$, the frequency-domain frequency offset estimation unit 312 performs a calculation on the residual frequency offset information $\Delta f_{FDij}(n)$ of the current frequency-domain channel and frequency-domain frequency offset information $\Delta f_{FDij}(n-L)$ obtained in a previous calculation to obtain frequency offset information $\Delta f_{ij}(n)$ of the current frequency-domain channel, updates frequency offset information $\Delta f_{FDij}(n-L)$ obtained in the previous calculation by using the frequency offset information $\Delta f_{FDij}(n)$ of the current channel, and saves the frequency offset information $\Delta f_{FDij}(n)$ of the current frequency-domain channel Then, the frequency-domain frequency offset estimation unit 312 outputs the frequency offset information $\Delta f_{FDij}(n)$ of the current frequency-domain channel to the frequency offset correction unit 12, so that the frequency offset correction unit 12 performs frequency-domain frequency offset correction on the signal of the current frequency-domain channel according to the frequency offset information $\Delta f_{FDij}(n)$. It should be noted that, in the embodiment of the present invention, after the frequency offset information $\Delta f_{FDij}(n)$ of the current frequency-domain channel is obtained, the frequency offset information $\Delta f_{FDij}(n)$ of the current frequency-domain channel may be used to update the frequency-domain frequency offset information $\Delta f_{FDij}(n-L)$ obtained in the previous calculation, and the frequency-domain frequency offset information $\Delta f_{FDij}(n)$ of the channel is saved. In this manner, it is ensured that frequency-domain frequency offset information $\Delta f_{FDij}(n)$ of the channel at a previous time is used in a subsequent frequency-domain frequency offset calculation process. However, the steps of updating and saving may not be performed, which is not limited by the present invention.

Furthermore, the frequency-domain frequency offset estimation unit 312 may further send the residual frequency offset information $\Delta f_{FDij}(n)$ of the current frequency-domain channel to the monitoring unit 313.

The monitoring unit 313 compares the residual frequency offset information $\Delta f_{FDij}(n)$ which is of the frequency-domain channel and obtained in a current frequency-domain calculation with a third preset threshold value, and if it is determined that all residual frequency offset information $\Delta f_{FDij}(n)$ which is of the frequency-domain channel and obtained in the calculation is smaller than the third preset threshold value, sends an indication signal to the frequency-domain channel estimation unit 311 and the channel equalization unit 13 to notify the frequency-domain channel estimation unit 311 that the channel information estimated at this time is reliable and may be sent to the channel equalization unit 13, to make the channel equalization unit 13 start working. If an equalizer of the channel equalization unit 13 has a built-in coefficient updating module, the equalizer of the channel equalization unit 13 may enable the module. On the contrary, if it is determined that at least one piece of the residual frequency offset information $\Delta f_{FDij}(n)$ which is of the frequency-domain channel and obtained in the calculation is greater than or equal to the third preset threshold value, the monitoring unit 313 sends an indication signal to the frequency-domain channel estimation unit 311 and the channel equalization unit 13 to notify the frequency-domain channel estimation unit 311 that the channel information estimated at this time is significantly affected by a frequency offset and cannot be sent to the channel equalization unit 13, and the channel equalization unit 13 stops working. For a channel, the third preset threshold value has a same function as a third threshold value. Due to its application in a frequency-domain channel, the preset threshold value is defined as the first threshold value. In this manner, for the frequency-domain channel, effectiveness of a signal may be detected more accurately.

It should be noted that, in this embodiment, the channel equalization unit 13 is a functional module after the frequency offset correction is performed, but the embodiment of the present invention is not limited to this, and the functional module after the frequency offset correction may be another functional unit or module. In addition, the third preset threshold value may be set manually, and the channel equalization unit 13 may be an equalizer, and may also be others, which is not specifically limited by the present invention.

In the frequency offset estimation method and system provided in the embodiment of the present invention, frequency-domain frequency offset estimation is performed in a manner of combining frequency-domain channel estimation and frequency-domain frequency offset estimation, which can process a carrier frequency offset in a high-frequency microwave communication system. In this manner, there is no need to perform the frequency offset estimation separately, thereby reducing calculation complexity and improving realizability. Furthermore, a residual frequency offset is monitored and eliminated, thereby improving accuracy of the channel estimation and stability of the system. In addition, by using the monitoring unit, effective detection and utilization of a signal frequency offset estimation result is implemented.

Figure 4:
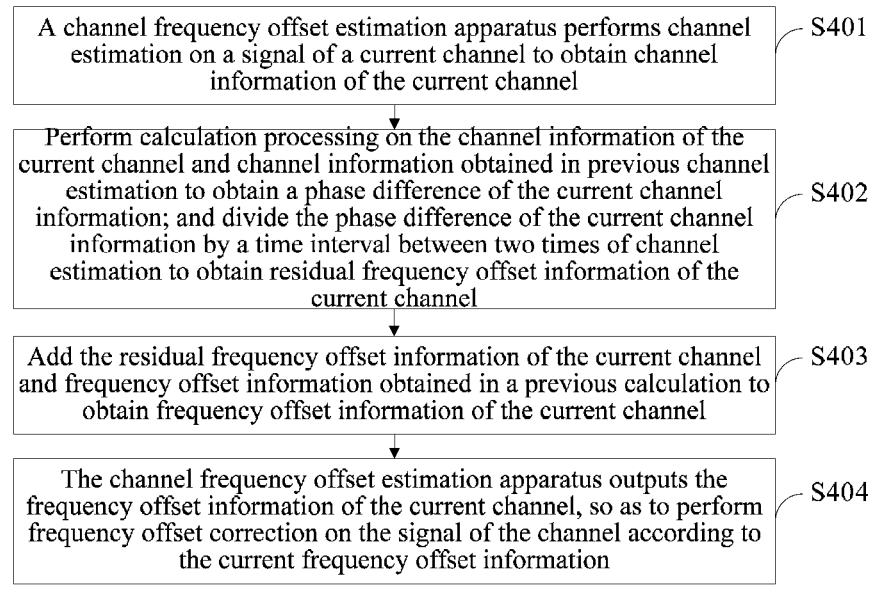
FIG. 4 is a flow chart of a frequency-domain frequency offset estimation method according to an embodiment of the present invention.

An embodiment of the present invention provides a frequency offset estimation method. As shown in FIG. 4, the method includes the following steps:

S401: A channel frequency offset estimation apparatus performs channel estimation on a signal of a current channel to obtain channel information $H_{ij}(n)$ of the current channel, where the $H_{ij}(n)$ indicates channel information of a channel from a $j^{th}$ sending end to an $i^{th}$ receiving end.

S402: Perform calculation processing on the channel information $H_{ij}(n)$ of the current channel and channel information $H_{ij}(n-L)$ obtained in previous channel estimation to obtain a phase difference of the current channel information; and divide the phase difference of the current channel information by a time interval between two times of channel estimation to obtain residual frequency offset information $\Delta f_{ij}(n)$ of the current channel, where L indicates a time interval between two times of channel estimation.

S403: Add the residual frequency offset information $\Delta f_{ij}(n)$ of the current channel and frequency offset information $\Delta f_{ij}(n-L)$ obtained in a previous calculation to obtain frequency offset information of the current channel S404: The channel frequency offset estimation apparatus outputs the frequency offset information $\Delta f_{ij}(n)$ of the current channel, so as to perform frequency offset correction on the signal of the channel according to the current frequency offset information $\Delta f_{ij}(n)$.

In the frequency offset estimation method provided in the embodiment of the present invention, frequency offset estimation is performed in a manner of combining channel estimation and frequency offset estimation, which can process a carrier frequency offset in a high-frequency microwave communication system. In this manner, there is no need to perform the frequency offset estimation separately, thereby reducing calculation complexity and improving realizability. Furthermore, a residual frequency offset is monitored and eliminated, thereby improving accuracy of the channel estimation and stability of the system.

Figure 5:
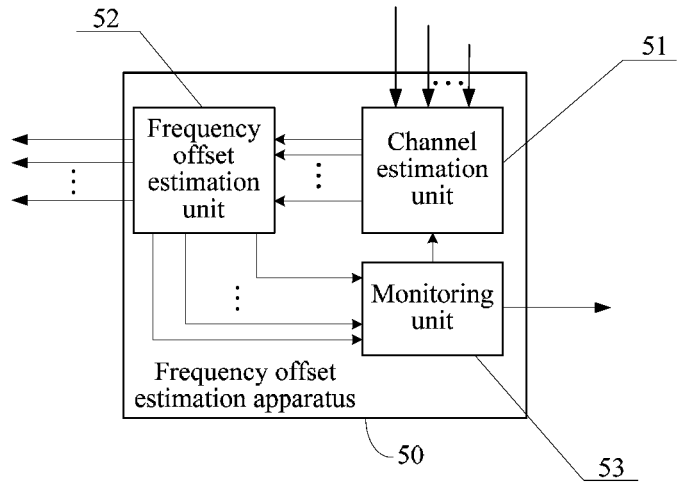
FIG. 5 is schematic structural diagram of a frequency offset estimation apparatus according to an embodiment of the present invention.

A frequency offset estimation apparatus 50 provided in the embodiment of the present invention corresponds to the foregoing method embodiment, and each functional unit of the frequency offset estimation apparatus may be used in the steps of the foregoing method. As shown in FIG. 5, the apparatus includes:

a channel estimation unit 51, configured to perform channel estimation on a signal of a current channel to obtain channel information $H_{ij}(n)$ of the current channel, where the $H_{ij}(n)$ indicates channel information of a channel from a $j^{th}$ sending end to an $i^{th}$ receiving end; and a frequency offset estimation unit 52, configured to perform calculation processing on the channel information $H_{ij}(n)$ obtained in current channel estimation and channel information $H_{ij}(n-L)$ obtained in previous channel estimation to obtain a current phase difference of the channel information, divide the current phase difference of the channel information by a time interval between two times of channel estimation to obtain residual frequency offset information $\Delta f'_{ij}(n)$ of the current channel, where L indicates a time interval between two times of channel estimation, add the residual frequency offset information $\Delta f'_{ij}(n)$ of the current channel and frequency offset information $\Delta f_{ij}(n-L)$ obtained in a previous calculation to obtain frequency offset information $\Delta f_{ij}(n)$ of the current channel, and output the frequency offset information $\Delta f_{ij}(n)$ of the current channel, so as to perform frequency offset correction on the signal of the channel according to the current frequency offset information $\Delta f_{ij}(n)$.

Furthermore, the frequency offset estimation apparatus 50 further includes:

a monitoring unit 53, connected to the channel estimation unit 51, the frequency offset estimation unit 52, and a functional module after frequency offset correction, and configured to compare the residual frequency offset information $\Delta f'_{ij}(n)$ which is of the channel and obtained in the current channel calculation with a first preset threshold value, and if it is determined that all residual frequency offset information $\Delta f'_{ij}(n)$ which is of the channel and obtained in the current calculation is smaller than the first preset threshold value, instruct the functional module after the frequency offset correction to start working.

The monitoring unit 53 is further configured to, if it is determined that at least one piece of the residual frequency offset information $\Delta f'_{ij}(n)$ which is of the channel and obtained in the calculation is greater than or equal to the first preset threshold value, instruct the functional module after the frequency offset correction to stop working.

In the frequency offset estimation apparatus provided in the embodiment of the present invention, frequency offset estimation is performed in a manner of combining channel estimation and frequency offset estimation, which can process a carrier frequency offset in a high-frequency microwave communication system. In this manner, there is no need to perform the frequency offset estimation separately, thereby reducing calculation complexity and improving realizability. Furthermore, a residual frequency offset is monitored and eliminated, thereby improving accuracy of the channel estimation and stability of the system. In addition, by using the monitoring unit, effective detection and utilization of a signal frequency offset estimation result is implemented.

Specific applications of the frequency offset estimation apparatus 50 in a time domain and a frequency domain have been described in the foregoing embodiments, and are not repeatedly described here.

The foregoing description is merely specific implementation manners of the present invention, but not intended to limit the protection scope of the present invention. Any variation or replacement that may be easily derived by those skilled in the art within the technical scope disclosed in the present invention shall fall within the protection scope of the present invention. Therefore, the protection scope of the present invention shall be subject to the appended claims.

What is claimed is:

1. A channel frequency offset estimation method, comprising:
    performing channel estimation on a signal of a current channel to obtain current channel information of the current channel;
    performing calculation processing on the current channel information obtained in current channel estimation and on previous channel information obtained in previous channel estimation to obtain a phase difference of the current channel information, and dividing the phase difference of the current channel information by a time interval between a time of the current channel estimation and a time of the previous channel estimation to obtain residual frequency offset information of the current channel;
    adding the residual frequency offset information of the current channel and frequency offset information which is of the previous channel and obtained in a previous calculation to obtain current frequency offset information of the current channel; and
    outputting the current frequency offset information of the current channel, so as to perform frequency offset correction on the signal of the current channel according to the current frequency offset information.

2. The method according to claim 1, wherein after the obtaining the residual frequency offset information of the current channel, the method further comprises:
    comparing the residual frequency offset information which is of the current channel and obtained in a current channel calculation with a first preset threshold value, and if it is determined that all residual frequency offset information which is of the channel and obtained in the current channel calculation is smaller than the first preset threshold value, instructing a functional module after the frequency offset correction to start working.

3. The method according to claim 2, comprising:
    if it is determined that at least one piece of the residual frequency offset information which is of the channel and obtained in the current channel calculation is greater than or equal to the first preset threshold value, instructing the functional module after the frequency offset correction to stop working.

4. The method according to claim 2, wherein the functional module after the frequency offset correction is an equalizer.

5. The method according to claim 1, wherein a formula for the performing the calculation processing on the current channel information obtained in the current channel estimation and the previous channel information obtained in the previous channel estimation is:

$$\Delta f'_{ij} = \frac{\angle(H_{ij}(n)) + \angle(H^*_{ij}(n-L))}{L},$$

wherein $[\bullet]^*$ indicates a symbol for calculating conjugation, $\angle$ is a symbol for calculating a phase angle, L indicates a time interval between a time of the current channel estimation and a time of the previous channel estimation, $H_{ij}(n)$ indicates the current channel information of the current channel, the $H_{ij}(n)$ indicates channel information of a channel from a $j^{th}$ sending end to an $i^{th}$ receiving end; $H_{ij}(n-L)$ indicates the previous channel information obtained in the previous channel estimation, and $\Delta f'_{ij}(n)$ indicates the residual frequency offset information of the current channel.

6. The method according to claim 1, wherein a formula for the performing the calculation processing on the current channel information obtained in the current channel estimation and the previous channel information obtained in the previous channel estimation may also be:

$$\Delta f'_{ij} = \frac{\angle(H_{ij}(n)) + \angle(H_{ij}(n-L))}{L},$$

wherein $\angle$ is a symbol for calculating a phase angle, L indicates a time interval between a time of the current channel estimation and a time of the previous channel estimation, $H_{ij}(n)$ indicates the current channel information of the current channel, the $H_{ij}(n)$ indicates channel information of a channel from a $j^{th}$ sending end to an $i^{th}$ receiving end; $H_{ij}(n-L)$ indicates the previous channel information obtained in the previous channel estimation, and $\Delta f'_{ij}(n)$ indicates the residual frequency offset information of the current channel.

7. The method according to claim 1, wherein a formula for the performing the calculation processing on the current channel information of the current channel and the previous channel information obtained in the previous channel estimation may also be:

$$\Delta f'_{ij} = \frac{\angle(H_{ij}(n) \cdot H^*_{ij}(n-L))}{L},$$

wherein $[\bullet]^*$ indicates a symbol for calculating conjugation, $\angle$ is a symbol for calculating a phase angle, L indicates a time interval between a time of the current channel estimation and a time of the previous channel estimation, $H_{ij}(n)$ indicates the current channel information of the current channel, the $H_{ij}(n)$ indicates channel information of a channel from a $j^{th}$ sending end to an $i^{th}$ receiving end; $H_{ij}(n-L)$ indicates the previous channel information obtained in the previous channel estimation, and $\Delta f'_{ij}(n)$ indicates the residual frequency offset information of the current channel.

8. The method according to claim 1, wherein a formula for the adding the residual frequency offset information of the current channel and the frequency offset information which is of the previous channel and obtained in the previous calculation is:

$\Delta f_{ij}(n) = \Delta f_{ij}(n-L) + \Delta f'_{ij}(n)$, wherein $\Delta f_{ij}(n-L)$ indicates the frequency offset information which is of the previous channel and obtained in the previous calculation, and $\Delta f_{ij}(n)$ indicates the frequency offset information of the current channel.

9. The method according to claim 1, wherein
in a time-domain channel, the performing the channel estimation on the signal of the current channel to obtain the current channel information of the current channel comprises: performing time-domain channel estimation on a signal of the time-domain channel at a current moment to obtain current time-domain channel information of the time-domain channel at the current moment;

in the time-domain channel, the performing the calculation processing on the current channel information obtained in the current channel estimation and the previous channel information obtained in the previous channel estimation to obtain the phase difference of the current channel information, and dividing the phase difference of the current channel information by the time interval between the time of the current channel estimation and the time of the previous channel estimation to obtain the residual frequency offset information of the current channel comprises:
performing calculation processing on the current time-domain channel information and previous time-domain channel information obtained in time-domain channel estimation at a previous moment to obtain. a phase difference of the time-domain channel information at the current moment, and dividing the phase difference of the time-domain channel information at the current moment by a time interval between a time of the current channel estimation and a time of the previous channel estimation to obtain residual frequency offset information of the time-domain channel at the current moment;

in the time-domain channel, the adding the residual frequency offset information of the current channel and the frequency offset information which is of the previous channel and obtained in the previous calculation to obtain the frequency offset information of the current channel comprises: adding the residual frequency offset information of the time-domain channel at the current moment and previous time-domain frequency offset information obtained in a calculation at the previous moment to obtain frequency offset information of the time-domain channel at the current moment; and in the time-domain channel, the outputting the frequency offset information of the current channel, so as to perform frequency offset correction on the signal of the channel according to the current frequency offset information comprises: outputting the frequency offset information of the time-domain channel at the current moment, so as to perform the frequency offset correction on the signal of the time-domain channel at the current moment according to the frequency offset information of the time-domain channel at the current moment.

10. The method according to claim 1, wherein, for a frequency domain, the method further comprises:

performing a fast Fourier transform or discrete Fourier transform on the signal of the current channel to obtain a channel signal of a current frequency-domain channel;

in the current frequency-domain channel, the performing the channel estimation on the signal of the current channel to obtain the current channel information of the current channel comprises: performing frequency-domain channel estimation on the signal of the current frequency-domain channel to obtain channel information of the current frequency-domain channel;

in the current frequency-domain channel, the performing the calculation processing on the current channel information obtained in the current channel estimation and the previous channel information obtained in the previous channel estimation to obtain the phase difference of the current channel information, and dividing the phase difference of the current channel information by the time interval between the time of the current channel estimation and the time of the previous channel estimation to obtain the residual frequency offset information of the current channel comprises:

performing calculation processing on the channel information obtained in the current frequency-domain channel estimation and previous frequency-domain channel information obtained in previous frequency-domain channel estimation to obtain an average phase difference of the current frequency-domain channel information, and dividing the average phase difference of the current frequency-domain channel information by a time interval between a time of the current channel estimation and a time of the previous channel estimation to obtain residual frequency offset information of the current frequency-domain channel;

in the frequency-domain channel, the adding the residual frequency offset information of the current channel and the frequency offset information which is of the previous channel and obtained in the previous calculation to obtain the frequency offset information of the current channel comprises: adding the residual frequency offset information of the current frequency-domain channel and frequency offset information which is of the previous frequency-domain channel and obtained in a previous calculation to obtain frequency offset information of the current frequency-domain channel; and in the frequency-domain channel, the outputting the frequency offset information of the current channel, so as to perform the frequency offset correction on the signal of the channel according to the current frequency offset information comprises: outputting the frequency offset information of the current frequency-domain channel, so as to perform the frequency-domain frequency offset correction on the signal of the current frequency-domain channel according to the frequency offset information of the current frequency-domain channel.

11. The method according to claim 10, wherein for the frequency-domain channel, a formula for the performing the calculation processing on the channel information obtained in the current frequency-domain channel estimation and the previous frequency-domain channel information obtained in the previous frequency-domain channel estimation is:

$$\Delta f'_{FDij}(n) = \frac{\sum_{k \in SC_{FD}} (\angle H_{ij,k}(n) + \angle H^*_{ij,k}(n-L))}{L*K},$$

wherein $[\bullet]^*$ indicates a symbol for calculating conjugation, $\angle$ is a symbol for calculating a phase angle, $\Sigma$ indicates summation, $k \in SC_{FD}$ indicates that k belongs to a frequency-domain sub-channel set, K indicates a quantity of sub-channels used for calculating a residual frequency offset, that is, the quantity used in the summation, $1 \leq K \leq N$, L indicates a time interval between a time of the frequency-domain current channel estimation and a time of the previous frequency-domain channel estimation, $H_{ij,k}(n)$ indicates the channel information of the current frequency-domain channel, the $H_{ij,k}(n)$ indicates channel information of a channel from a $j^{th}$ sending end to an $i^{th}$ receiving end in a $k^{th}$ sub-channel, $H_{ij,k}(n-L)$ indicates the previous frequency-domain channel information obtained in the previous channel estimation, and $\Delta f'_{FDij}(n)$ indicates the residual frequency offset information of the current frequency-domain channel.

12. The method according to claim 10, wherein for the frequency-domain channel, a formula for the performing the calculation processing on the channel information obtained in the current frequency-domain channel estimation and the previous frequency-domain channel information obtained in the previous frequency-domain channel estimation may also be:

$$\Delta f'_{FDij}(n) = \frac{\sum_{k \in SC_{FD}} (\angle H_{ij,k}(n) - \angle H_{ij,k}(n-L))}{L*K},$$

wherein $\angle$ is a symbol for calculating a phase angle, $\Sigma$ indicates summation, $k \in SC_{FD}$ indicates that k belongs to a frequency-domain sub-channel set, K indicates a quantity of sub-channels used for calculating a residual frequency offset, that is, the quantity used in the summation, $1 \leq K \leq N$, L indicates a time interval between a time of the current frequency-domain channel estimation and a time of the previous frequency-domain channel estimation, $H_{ij,k}(n)$ indicates the channel information of the current frequency-domain channel, the $H_{ij,k}(n)$ indicates channel information of a channel from a $j^{th}$ sending end to an $i^{th}$ receiving end in a $k^{th}$ sub-channel, $H_{ij,kk}(n-L)$ indicates the previous frequency-domain channel information obtained in the previous channel estimation, and $\Delta f'_{FDij}(n)$ indicates the residual frequency offset information of the current frequency-domain channel.

13. The method according to claim 10, wherein for the frequency-domain channel, a formula for the performing the calculation processing on the channel information obtained in the current frequency-domain channel estimation and the previous frequency-domain channel information obtained in the previous frequency-domain channel estimation may also be:

$$\Delta f'_{FDij}(n) = \frac{\sum_{k \in SC_{FD}} \angle(H_{ij,k}(n) \cdot H^*_{ij,k}(n-L))}{L*K},$$

wherein $[\bullet]^*$ indicates a symbol for calculating conjugation, $\angle$ is a symbol for calculating a phase angle, $\Sigma$ indicates summation, $k \in SC_{FD}$ indicates that k belongs to a frequency-domain sub-channel set, K indicates a quantity of sub-channels used for calculating a residual frequency offset, that is, the quantity used in the summation, $1 \leq K \leq N$, L indicates a time interval between a time of the current frequency-domain channel estimation and a time of the previous frequency-domain channel estimation, $H_{ij,k}(n)$ indicates the channel information of the current frequency-domain channel, the $H_{ij,k}(n)$ indicates channel information of a channel from a $j^{th}$ sending end to an $i^{th}$ receiving end in a $k^{th}$ sub-channel, $H_{ij,k}(n-L)$ indicates the previous frequency-domain channel information obtained in the previous channel estimation, and $\Delta f_{FDij}(n)$ indicates the residual frequency offset information of the current frequency-domain channel.

14. The method according to claim 10, wherein a formula for the adding the residual frequency offset information of the current frequency-domain channel and the frequency offset information which is of the previous frequency-domain channel and obtained in the previous calculation is: $\Delta f_{FDij}(n)=\Delta f_{FDij}(n-L)\pm\Delta f_{FDij}(n)$, wherein $\Delta f_{FDij}(n-1)$ indicates previous frequency-domain frequency offset information obtained in the previous calculation, and $\Delta f_{FDij}(n)$ indicates the frequency offset information of the current frequency-domain channel.

15. A non-transitory computer readable medium including computer-executable instructions for execution on a channel frequency offset estimation apparatus, such that when the computer-executable instructions are executed by the apparatus a method is carried out comprising:
  performing channel estimation on a signal of a current channel to obtain current channel information of the current channel;
  performing calculation processing on the current channel information obtained in the current channel estimation and previous channel information obtained in a previous channel estimation to obtain a phase difference of the current channel information, divide the phase difference of the current channel information by a time interval between a time of the current channel estimation and a time of the previous channel estimation to obtain residual frequency offset information of the current channel;
  adding the residual frequency offset information of the current channel and frequency offset information which is of the previous channel and obtained in a previous calculation to obtain frequency offset information of the current channel; and
  outputting the frequency offset information of the current channel, so as to perform frequency offset correction on the signal of the current channel according to the current frequency offset information.

16. The computer readable medium according to claim 15, further comprising computer-executable instructions for:
  comparing the residual frequency offset information which is of the current channel and obtained in a current channel calculation with a first preset threshold value; and
  instructing a functional module after the frequency offset correction to start working when all residual frequency offset information which is of the channel and obtained in the current calculation is smaller than the first preset threshold value.

17. The computer readable medium according to claim 15, further comprising computer-executable instructions for:
  instructing a functional module after the frequency offset correction to stop working when at least one piece of the residual frequency offset information which is of the current channel and obtained in the current calculation is greater than or equal to the first preset threshold value.

18. The computer readable medium according to claim 15, wherein the channel estimation and the calculation processing are performed in the time-domain.

19. The computer readable medium according to claim 15, further comprising computer-executable instructions for:
  performing at least one of a fast Fourier transform and discrete Fourier transform on a signal of the current channel to obtain a signal of a current frequency-domain channel;
  performing frequency-domain channel estimation on the signal of the current frequency-domain channel to obtain channel information of the current frequency-domain channel; and
  performing calculation processing on the channel information obtained in current frequency-domain channel estimation and previous frequency-domain channel information obtained in previous frequency-domain channel estimation to obtain a phase difference of the current frequency-domain channel information, divide the phase difference of the current frequency-domain channel information by a time interval between a time of the current channel estimation and a time of the previous channel estimation to obtain residual frequency offset information of the current frequency-domain channel;
  adding the residual frequency offset information of the current frequency-domain channel and frequency offset information which is of the previous frequency-domain channel and obtained in a previous calculation to obtain frequency offset information of the current frequency-domain channel; and
  outputting the frequency offset information of the current frequency-domain channel, so as to perform frequency-domain frequency offset correction on the signal of the current frequency-domain channel according to the frequency offset information of the current frequency-domain channel.

20. A channel frequency offset estimation system, comprising:
  a processor; and
  a non-transitory computer-readable storage medium including computer-executable instructions executed by the processor to perform the method comprising:
    performing channel estimation on a signal of a current channel to obtain current channel information of the current channel;
    performing calculation processing on the current channel information obtained in the current channel estimation and previous channel information obtained in a previous channel estimation to obtain a phase difference of the current channel information, divide the phase difference of the current channel information by a time interval between a time of the current channel estimation and a time of the previous channel estimation to obtain residual frequency offset information of the current channel;
    adding the residual frequency offset information of the current channel and frequency offset information which is of the previous channel and obtained in a previous calculation to obtain frequency offset information of the current channel; and
    outputting the frequency offset information of the current channel, so as to perform frequency offset correction on the signal of the current channel according to the current frequency offset information.

* * * * *